United States Patent
Lindgren

(10) Patent No.: US 12,480,518 B2
(45) Date of Patent: *Nov. 25, 2025

(54) PROPELLER BLADE SPACER FOR AQUACULTURE NET CLEANING

(71) Applicant: Peter B. Lindgren, Pompano Beach, FL (US)

(72) Inventor: Peter B. Lindgren, Pompano Beach, FL (US)

(*) Notice: Subject to any disclaimer, the term of this patent is extended or adjusted under 35 U.S.C. 154(b) by 0 days.
This patent is subject to a terminal disclaimer.

(21) Appl. No.: 19/056,283

(22) Filed: Feb. 18, 2025

(65) Prior Publication Data
US 2025/0320878 A1    Oct. 16, 2025

Related U.S. Application Data

(63) Continuation-in-part of application No. 18/316,650, filed on May 12, 2023, now Pat. No. 12,250,930.

(51) Int. Cl.
*F04D 29/18* (2006.01)
*A01K 63/10* (2017.01)
(Continued)

(52) U.S. Cl.
CPC ............ *F04D 29/181* (2013.01); *A01K 63/10* (2017.01); *B08B 1/165* (2024.01); *B08B 1/36* (2024.01);
(Continued)

(58) Field of Classification Search
CPC .............. F04D 29/181; F04D 29/007; F05D 2240/303; A01K 63/10; B08B 1/165; B08B 1/36; B08B 7/02
See application file for complete search history.

(56) References Cited

U.S. PATENT DOCUMENTS 8,881,683 B2 * 11/2014 Lindgren ............... A01K 63/10
  119/264
2012/0260443 A1 * 10/2012 Lindgren ............... A46B 13/02
  15/77
(Continued)

FOREIGN PATENT DOCUMENTS

WO    WO-2020069556 A1 * 4/2020 ............... B63G 8/08

OTHER PUBLICATIONS

PCT, Written Opinion of the International Searching Authority, Dec. 5, 2023 (Year: 2023).*

*Primary Examiner* — Andrew J Marien
(74) *Attorney, Agent, or Firm* — McHale & Slavin, P.A.

(57) ABSTRACT

A propeller assembly to facilitate the cleaning of aquaculture nets. The propeller assembly has a centrally disposed hub with a plurality of plastic composite blades extending outwardly to a perimeter ring. A plurality of triangular shaped rigid knuckles are coupled to the perimeter ring. A blade spacer is attached to a leading edge of each blade, the knuckle and blade spacer are constructed of a wear resistant non-ferrous material, ferrous material, or combination thereof. In operation, rotation of the blades provides thrust for positioning the knuckles against an aquaculture net, whereby the knuckles remove fouling from the aquaculture net by violently shaking the aquaculture net. The blade spacer positions the propeller assembly a predetermined distance from the aquaculture net to protect the leading edge by distance and/or use of the wear resistant material.

9 Claims, 4 Drawing Sheets

(51) Int. Cl.
*B08B 1/16* (2024.01)
*B08B 1/36* (2024.01)
*B08B 7/02* (2006.01)
*F04D 29/00* (2006.01)

(52) U.S. Cl.
CPC .............. *B08B 7/02* (2013.01); *F04D 29/007* (2013.01); *F05D 2240/303* (2013.01); *F05D 2300/43* (2013.01)

(56) References Cited

U.S. PATENT DOCUMENTS

| | | | |
|---|---|---|---|
| 2013/0263770 A1* | 10/2013 | Andersen | B63G 8/26 114/330 |
| 2018/0242726 A1* | 8/2018 | Lindgren | A46B 13/001 |
| 2019/0037815 A1* | 2/2019 | Lindgren | A01K 61/60 |

* cited by examiner

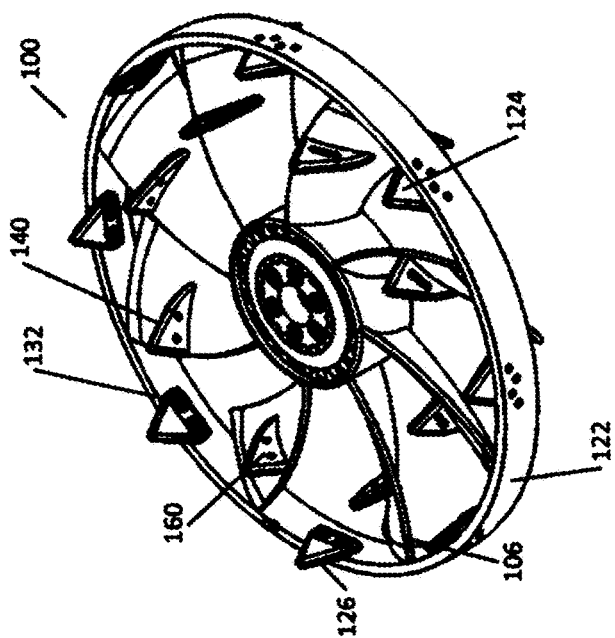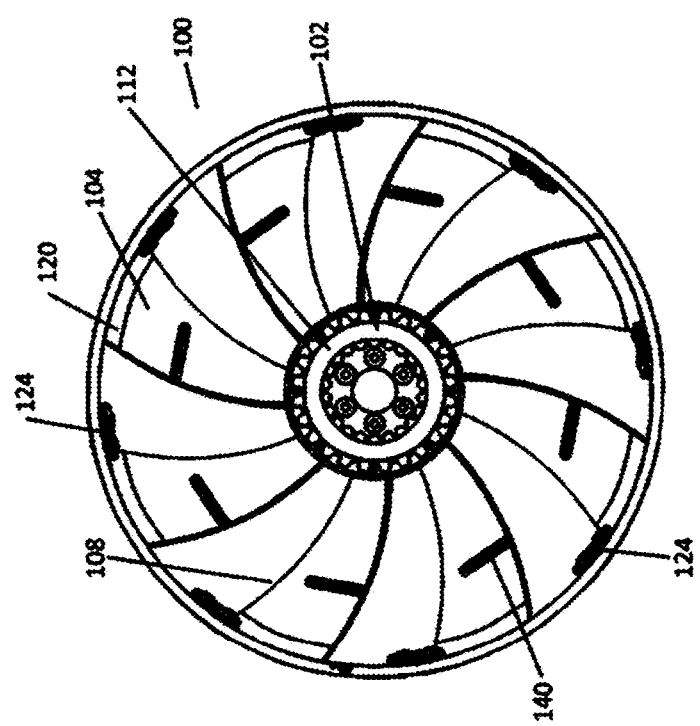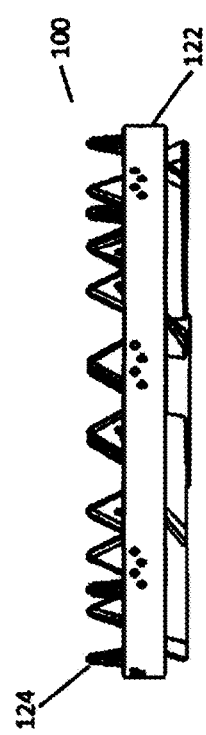

PROPELLER BLADE SPACER FOR AQUACULTURE NET CLEANING

PRIORITY CLAIM

In accordance with 37 C.F.R. § 1.76, a claim of priority is included in an Application Data Sheet filed concurrently herewith. Accordingly, the present invention is a continuation in part of U.S. patent application Ser. No. 18/316,650, entitled "PROPELLER BLADE SPACER FOR AQUACULTURE NET CLEANING", filed May 12, 2023, the contents of which is incorporated herein by reference

FIELD OF THE INVENTION

This invention is related to the field of open ocean aquaculture and, in particular, to propeller blade spacers for use with aquaculture net cleaning.

BACKGROUND OF THE INVENTION

Aquaculture is defined as the farming of aquatic organisms in a controlled aquatic environment. Nets are most commonly used to provide a controlled area for the farm environment, the nets forming a boundary to keep fish in and predators out. To optimize the productivity of the farm, the controlled area requires good water quality. Without good quality water, the farm fish can quickly succumb to various diseases. While nets are used to keep the fish within a controlled area, nets are also a breeding area for marine growth which can limit the flow of water. Excess marine growth inhibits the flow water necessary to keep the netted area clean, as the water can quickly become unhealthy. For this reason alone, limiting the marine growth becomes absolutely necessary to maintain healthy water conditions within the net.

Cleaning of the nets is now recognized as critical to the health of the fish. Various cleaning techniques exist, including the use of automated underwater cleaning systems. Applicant taught the use of propeller driven knuckles in Applicant's prior U.S. Pat. Nos. 11,116,188; 11, 523, 595; and 10,918,199, the contents of which are incorporated herein by reference. Applicant's propeller driven system is used to traverse the net using shaped knuckles having a forward surface and a trailing surface constructed and arranged to be forcefully presented to an aquaculture net by the propeller. The propeller provides thrust for pressing the knuckles against the aquaculture net, whereby the knuckles remove fouling by causing the aquaculture net to ride up the knuckle, resulting in a violent shaking of the aquaculture net proven to efficiently remove even the hardest of growth.

The problem, to which this invention is directed, is the protection of plastic composite propeller blades that can damaged during removal of barnacles or the like marine growth from a net used in aquaculture.

PRIOR ART

Known prior art regarding aquatic net cleaners include U.S. Pat. Nos. 3,628,489; 4,084,535; 4,252,081; 4,838,193; 4,970,747; 6,070,547; 8,635,730; JP08-228614; JP409009818A; JP409044238A; JP410035587A.

SUMMARY OF THE INVENTION

A propeller assembly with a wear resistant blade guard to facilitate the cleaning of underwater nets. The propeller assembly has a centrally disposed hub with a plurality of plastic composite blades extending outwardly therefrom. A perimeter ring is coupled to an outer tip of each blade with a plurality of triangular shaped rigid knuckles having a forward surface and a trailing surface forming two opposed convex edges and a base coupled to the perimeter ring. In one embodiment, the knuckles are constructed of a non-ferrous group of plastic composites selected from the group comprising: Carbon Fiber-Reinforced nylon or polyurethane, Glass Fiber-Reinforced Polymer, Polyether Ether Ketone with Carbon Fiber, Kevlar-Reinforced Polymer; Basalt reinforced polymer; ultra-high molecular weight polyethylene; or polycarbonate. Each forward surface is constructed and arranged to be forcefully presented to an aquaculture net upon rotation of the blades. A blade spacer is attached to the leading edge of each blade; the blade spacer is constructed of a wear resistant material. In operation, rotation of the blades provides thrust for positioning the knuckles against the aquaculture net, whereby the knuckles remove fouling from the aquaculture net by causing the aquaculture net to ride up the forward surface of each knuckle and down the trailing surface; the knuckle allowing for removal of growth by impact by violently shaking the aquaculture net. Each blade spacer positions the propeller assembly a predetermined distance from the aquaculture net to prevent premature wear of the plastic composite blades. The blade spacers can be made of the same plastic composites references with the knuckles.

An objective of the invention is to provide a propeller assembly using propeller blades protected by a wear resistant blade spacer to maintain a predetermined distance between the leading edge of the propeller blades and the net to be cleaned.

Still another objective of the invention is provide a wear resistant attachment for plastic composite propeller blades allowing the use of low cost/lightweight propellers with a wear resistant attachment that can withstand highly abrasive engagement with barnicles or the like growth.

Another objective of the invention is to teach the use of either a horizontally disposed attachment or a vertically disposed attachment to provide blade spacing from an abrasive engagement. The blade spacer material of construction is dependent upon the type of marine growth to be addressed. Preferably the knuckle and blade spacer being a wear resistant ferrous material or non-ferrous material, or a combination thereof.

Other objectives and further advantages and benefits associated with this invention will be apparent to those skilled in the art from the description, examples and claims which follow. In combination, the articulated knuckle designs with the elastomeric coupling opens the design window for improved cleaning with less power and wear on the net and equipment.

BRIEF DESCRIPTION OF THE DRAWINGS

FIG. 9 is a front perspective view of the aquaculture net cleaning system propeller with vertically disposed spacers attached to propeller blades;

FIG. 10 is a front plane view thereof;

FIG. 11 is a side view thereof;

DETAILED DESCRIPTION OF THE PREFERRED EMBODIMENT

A detailed embodiment of the instant invention is disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 4:
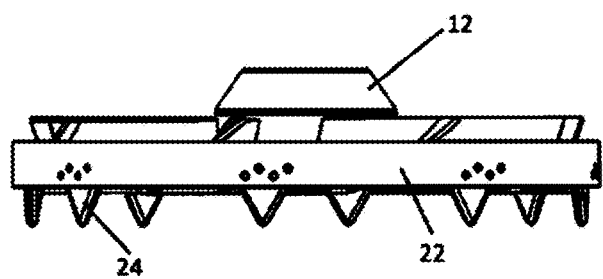
FIG. 4 is a side view thereof.
Figure 1:
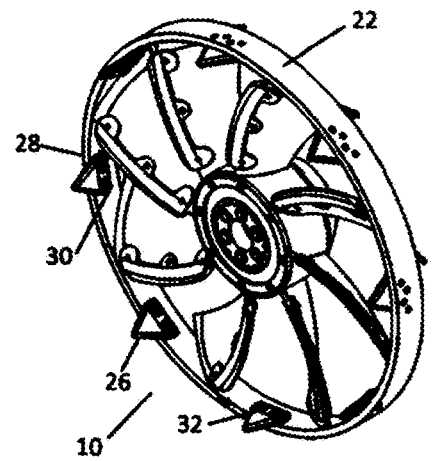
FIG. 1 is a front perspective view of the aquaculture net cleaning system propeller with horizontally disposed spacers attached to propeller blades.
Figure 2:
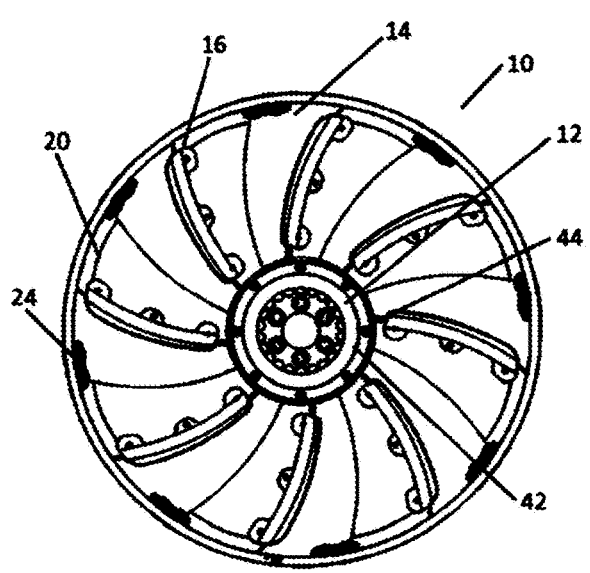
FIG. 2 is a top plane view thereof.
Figure 3:
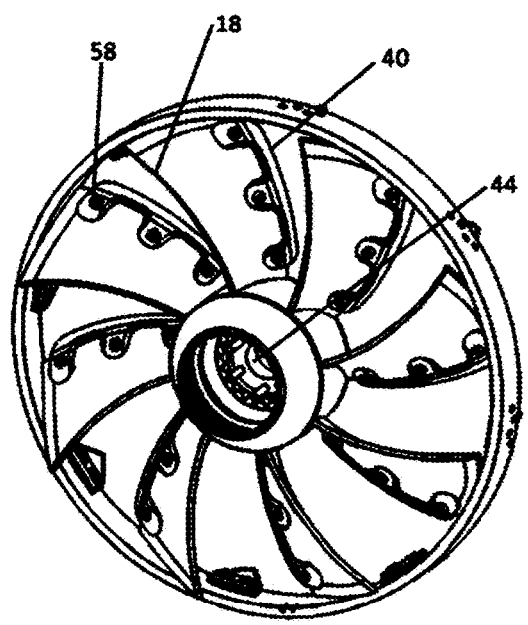
FIG. 3 is a bottom perspective view thereof.
Figure 8:
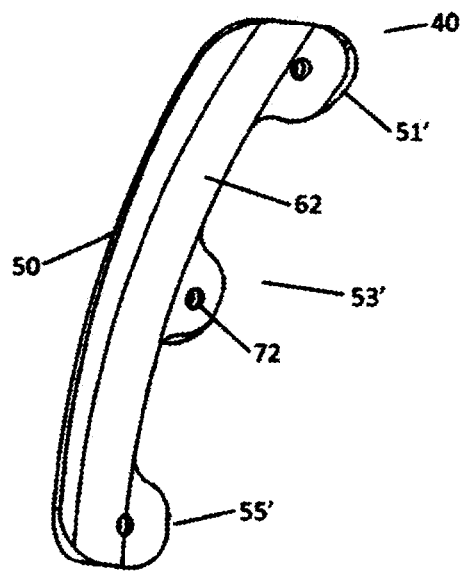
FIG. 8 is a bottom right perspective view thereof.
Figure 7:
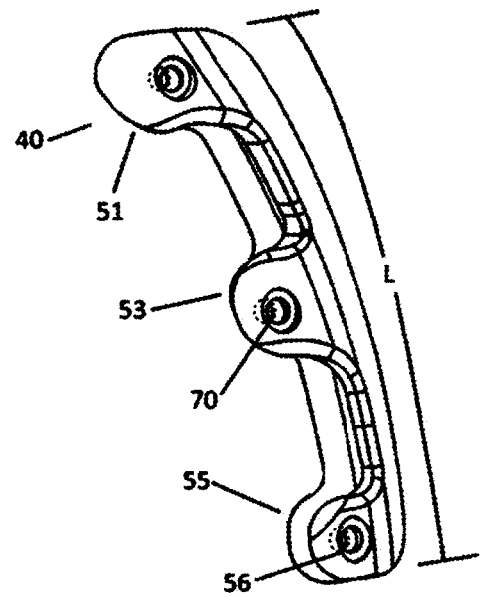
FIG. 7 is a bottom left perspective view thereof.
Figure 5:
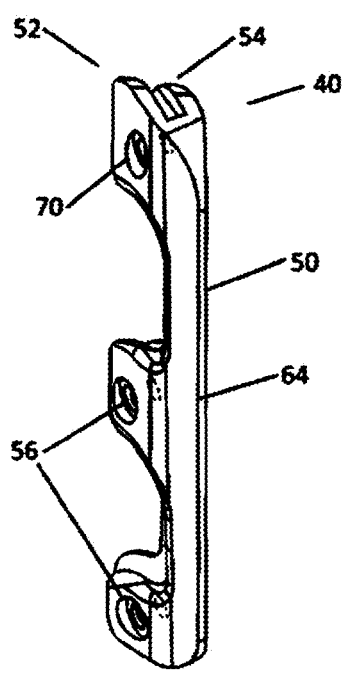
FIG. 5 is a left front perspective view of the horizontally disposed spacer.
Figure 6:
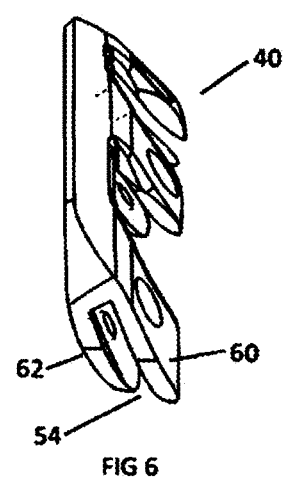
FIG. 6 is a right front perspective view thereof.

Referring now to FIGS. 1-8, depicted is the propeller assembly 10 for use with an aquaculture net cleaning system. The propeller assembly 10 has a centrally disposed hub 12 with a plurality of plastic composite blades 14 extending therefrom. Each blade 14 has a leading edge 16, a trailing edge 18, and an outer tip 20. A perimeter ring 22 is coupled to the outer tip 20 of each blade 14; the perimeter ring 22 forming a continuous circular shaped sidewall. A plurality of triangular shaped rigid knuckles 24 having a forward surface 26 and a trailing surface 28 forming two opposed convex edges and a base 30 coupled to the perimeter ring 22 using fasteners 32. The forward surface 26 of each knuckle 24 is constructed and arranged to be forcefully presented to an aquaculture net upon rotation of the propeller assembly 10.

In one embodiment, the blades used in the system are fabricated from anodized aluminum. Aluminum propeller blades are light in weight when compared to metal propeller blades. The light weight reduces the amount of buoyancy required to maintain under water depth positioning. Further, aluminum is lower in cost compared to a metal propeller blade, and easier to fabricate. However, aluminum is relatively soft and wears quickly when forced against barnacles firmly attached to underwater nets. In another embodiment, the blades used in the system are fabricated from plastic composite. Depending on the plastic composite material, the plastic needs to be protected from sharp impacts such as engaging with hardened barnacles. Barnacles secrete hard calcium plates that completely encase them. Barnacles have the ability to attach to the net with a natural adhesive strength of over 20 lbs. per square inch which can withstand a pulling strength of over 5,000 lbs. To allow the efficient use of a non ferrous blade, a blade spacer 40 is attached to the leading edge of each blade 14. The blade spacer 40 is constructed of either a ferrous or non ferrous wear resistant material.

The blade spacer 40 is further defined as an attachment bracket having a front side 50 forming an extension edge 64 extending a length L, and a back side 52 forming a channel 54. The channel 54 is positioned over the leading edge 16 of the blade 14 with apertures 56 formed on each side of the channel 54 for receipt of a fastener 58 extending through the blade 14. The channel 54 is formed from a first side wall 60 spaced apart from a second side wall 62 a distance equal to the thickness of the blade 14. The extension edge 64 has an angular shape providing a shaped prefix to the pitch of the blade 14 and a width equal to or less than the width of the blade 14. The shaped prefix facilitates the blade operation in drawing the assembly to a net. In a preferred embodiment, apertures 56 on a first side wall 60 are countersunk 70, allowing receipt of a fastener 58 to be flush with the surface of the first side wall 60 to avoid shearing of the fastener 58 during blade rotation; the second side wall 62 having a threaded receptacle 72 wherein the fastener 58 head is beneath the surface of the first side wall 60 to lessen fluid friction while the propeller is rotating and protect the fastener 58 from damage, allowing the fastener to be easily removed for exchange of the blade spacer 40. In a preferred embodiment, the first side wall 60 has three tangs 51, 53, and 55 each with a countersunk receptacle 70 and aperture 56 which are aligned with the second side wall 62 tangs 51', 53', and 55' each with a threaded aperture 72 for receipt of the fastener 58.

In a preferred embodiment, the elastomeric hub 12 forms a flexible drive coupling to facilitate the use of the knuckles 24 and blade spacers 40. The elastomeric hub 12 operates as a shock absorber to lessen impact damage to the knuckles 24 when removing aged barnacles or other hard growth that would otherwise cause spike loads. The elastomeric hub 12 consists of a driver 42 having a plurality of splined shaped formations 44 positioned around the diameter of the driver 42. The driver 42 is formed from a rigid material such as aluminum, Delrin®, or the like. The elastomeric hub 12 is constructed and arranged to prevent spike loads in a rotational direction and parallel to the rotational axis of the propeller simultaneously. The elastomeric hub 12 forms a flexible element, preferably with a durometer between 70 and 90 A shore hardness; the I.D. and O.D. of the flexible element and mating surface are splined.

The rotation of the blades 14 provides thrust for positioning the knuckles 24 against an aquaculture net positioned underwater, not shown. The knuckles 24 remove fouling from the aquaculture net by causing the aquaculture net to ride up the forward surface 26 of the knuckle 24 and down the trailing surface 28. Upon the aquaculture net traversing the knuckle 24, the aquaculture net returns to position, allowing for removal of growth by impact of the knuckles 24 and violently shaking the aquaculture net. Each blade spacer 40 positions the propeller assembly 10 a predetermined distance from the aquaculture net and further provides a wear resistant extension edge 64 having an angular shape providing a shaped prefix to the pitch of the blade 14. The blade spacers 40 extend outwardly from the leading edge 16 of the blade 14 at a height that is less than the height of the knuckles 24. The blade spacers 40 increase and maintain the efficiency of the blades 14 and rotational speeds for better cleaning of the net.

Figure 13:
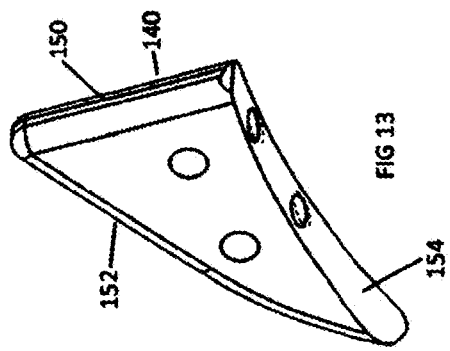
FIG. 13 is a bottom left perspective view thereof.
Figure 14:
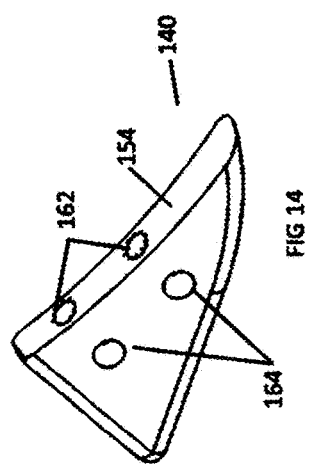
FIG. 14 is an inverted bottom view thereof.
Figure 12:
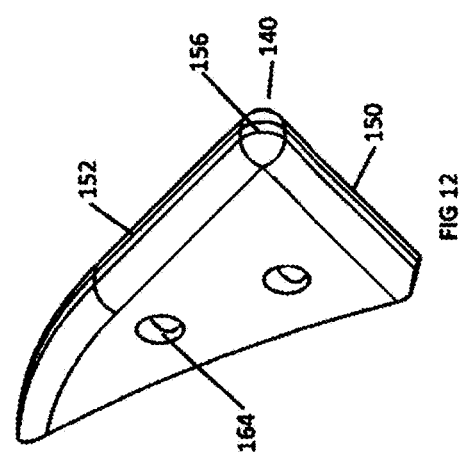
FIG. 12 is a front left perspective view of the vertically disposed spacer.
Figure 16:
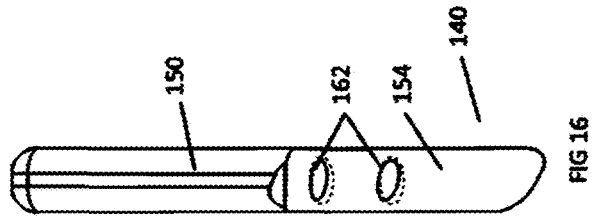
FIG. 16 is an end view thereof.
Figure 15:
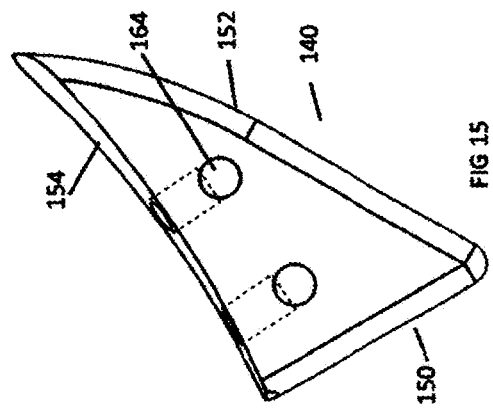
FIG. 15 is a right side view thereof.

Referring now to FIGS. 9-16, depicted is an alternative embodiment of the propeller assembly 100 for use with an aquaculture net cleaning system, the propeller assembly 100 having a centrally disposed hub 102 with a plurality of plastic composite blades 104 extending therefrom. Each blade 104 has a leading edge 106, a trailing edge 108, and an outer tip 120. A perimeter ring 122 is coupled to the outer tip 120 of each blade 104. The perimeter ring 122 forms a continuous circular shaped sidewall. A plurality of triangular shaped rigid knuckles 124 are coupled to the perimeter ring 122 with fasteners 132. A forward surface 126 of each knuckle 124 is constructed and arranged to be forcefully presented to an aquaculture net upon rotation of the assembly 100. A blade spacer 140 is attached to the leading edge 106 of each plastic composite blade 104. The blade spacer 140 provides a distance between the leading edge 106 of the blade 104 to reduce wear on the leading edge 106. The blade spacer 140 is constructed of a wear resistant plastic composite, stainless steel, bronze or titanium. Plastic composites include but are not limited to: Carbon Fiber-Reinforced nylon or polyurethane; Glass Fiber-Reinforced Polymer (GFRP); PEEK (Polyether Ether Ketone) with Carbon Fiber; Kevlar-Reinforced Polymer; Basalt reinforced polymer; ultra-high molecular weight polyethylene (UHMWPE); polycarbonate. Plastic composites are strong, lightweight, impact-resistant, and fatigue-resistant.

As with the previous embodiment, an elastomeric hub 102 forms a flexible drive coupling to facilitate the use of the knuckles 124 and blade spacers 140. The elastomeric hub 102 operates as a shock absorber to lessen impact damage to the propeller assembly 100 when engaging aged barnacles or other hard growth that would otherwise cause spike loads.

The blade spacer 140 is further defined as an attachment bracket having a leading edge 150, a trailing edge 152, and a mounting base 154. The height of a tip 156 forming a transition between the leading edge 150 and the trailing edge 152 extends a height for positioning the propeller assembly 100 a predetermined distance from an aquaculture net. The predetermined distance is designed to space the leading edge 106 of each blade 104 from a net to provide protection to the leading edge 106 from premature wear due to barnacles or other hard material, which can quickly wear the plastic composite blades 104, resulting in a loss of surface area. Once the blades 104 are damaged, the inefficiency of the net cleaning process is immediate.

In one embodiment the leading edge 150 is positioned perpendicular to the blade 104 and the trailing edge 152 tapers along the length of the blade 104, wherein the tip 156 forms a substantially triangular shape. In another embodiment the tip is rounded, providing a gentle reduction between the leading edge 150 and the trailing edge 152. The mounting base 154 follows the shape of the blade 104 to distribute the stress induced by impact across a length of the blade 104. The spacer 140 is removably attached to the blade 104 with a fastener 160 that extends through the blade 104 to engage a threaded receptacle 162 formed in the mounting base 154. Relief holes 164 are formed in the spacer 140, which facilitates manufacturing by providing a relief area required for the threaded receptacles 162.

All patents mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A propeller blade spacer for aquaculture net cleaning comprising: a propeller assembly having a centrally disposed hub with a plurality of blades extending therefrom, each blade of the plurality of blades having a leading edge, a trailing edge, and an outer tip; a perimeter ring coupled to said outer tip of each said blade; a plurality of triangular shaped rigid knuckles having a forward surface and a trailing surface forming two opposed convex edges and a base coupled to said perimeter ring, wherein each said forward surface is constructed and arranged to be forcefully presented to an aquaculture net upon rotation of each said blades; and a blade spacer attached to the leading edge of each said plastic composite blade, said blade spacer positioned perpendicular to said blade leading edge extending a predetermined height for positioning said propeller assembly a predetermined distance from the aquaculture net, said blade spacer constructed of a wear resistant material;
wherein rotation of said blades provides thrust for positioning said knuckles against the aquaculture net positioned underwater, whereby said knuckles remove fouling from the aquaculture net by causing the aquaculture net to ride up said forward surface of said knuckle and down said trailing surface of said knuckle; and upon the aquaculture net traversing said knuckle, the aquaculture net returns to position, allowing for removal of growth by impact and violently shaking the aquaculture net, and each said blade spacer positioning said propeller assembly a predetermined distance from the aquaculture net.

2. The propeller blade spacer according to claim 1 wherein a blade spacer material is selected from a non-ferrous group consisting of: Carbon Fiber-Reinforced nylon or polyurethane, Glass Fiber-Reinforced Polymer, Polyether Ether Ketone with Carbon Fiber, Kevlar-Reinforced Polymer; Basalt reinforced polymer; ultra-high molecular weight polyethylene; or polycarbonate.

3. The propeller blade spacer according to claim 1 wherein a blade spacer material is selected from a ferrous group consisting of: stainless steel, bronze or titanium.

4. The propeller blade spacer according to claim 1 wherein a trailing edge of said blade spacer is relieved with a bottom edge conforming to a shape of each said blade.

5. The propeller blade spacer according to claim 1 wherein a leading edge of said blade spacer transitions to a trailing edge with a rounded tip.

6. The propeller blade spacer according to claim 1 wherein said blade spacer is threadingly attached to each said blade, said blade spacer constructed and arranged to receive a threaded fastener placed through each said blade.

7. The propeller blade spacer according to claim 6 wherein said blade spacer includes a threaded receptacle for receipt of the threaded fastener.

8. The propeller blade spacer according to claim 1 wherein said plurality of blades are attached to an elastomeric hub.

9. The propeller blade spacer according to claim 1 including a plurality of knuckles selected from a non-ferrous group consisting of: Carbon Fiber-Reinforced nylon or polyurethane, Glass Fiber-Reinforced Polymer, Polyether Ether Ketone with Carbon Fiber, Kevlar-Reinforced Polymer; Basalt reinforced polymer; ultra-high molecular weight polyethylene; or polycarbonate.

* * * * *